April 16, 1940.  R. S. HINSEY  2,197,550
APPARATUS FOR TEMPERING GLASS
Filed Aug. 23, 1937  2 Sheets-Sheet 1
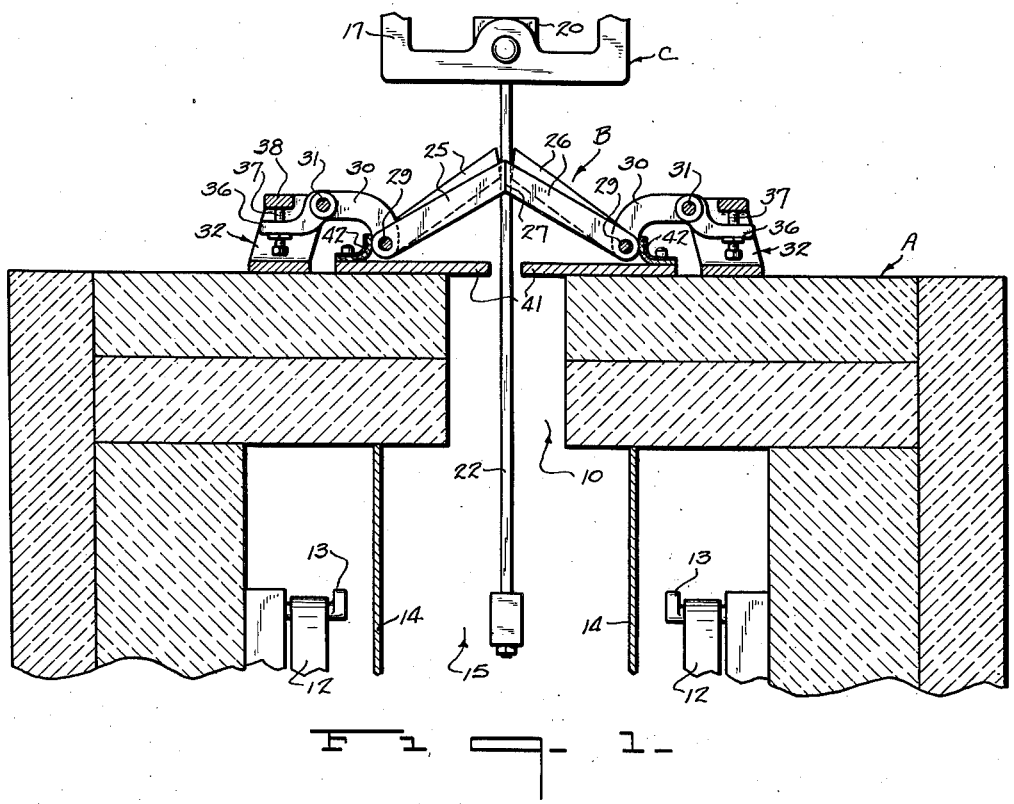
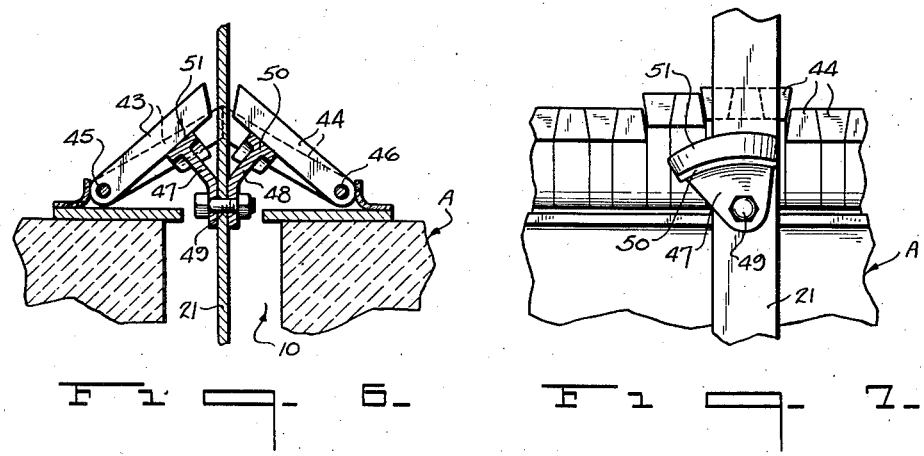
Inventor
ROBERT S. HINSEY.
By Frank Fraser
Attorney

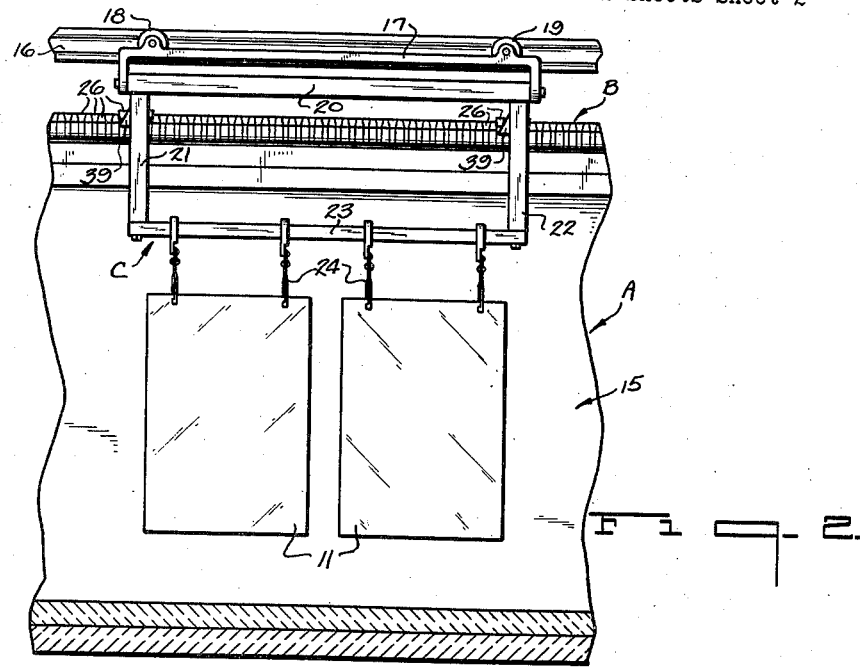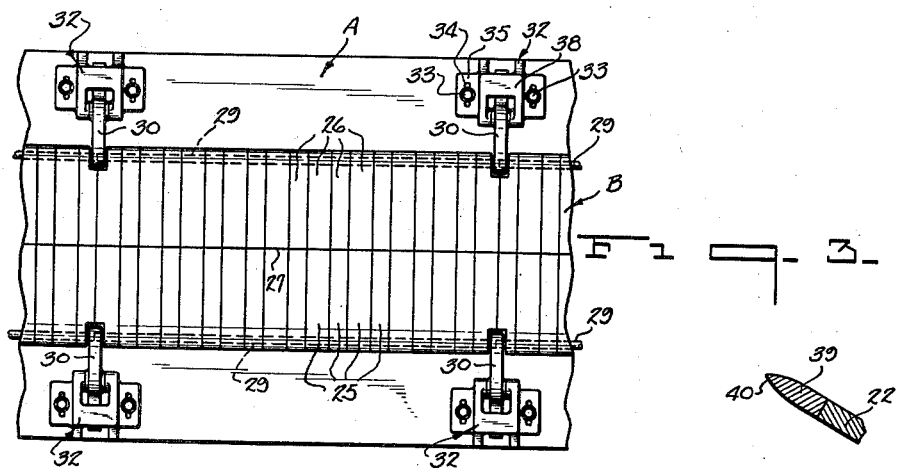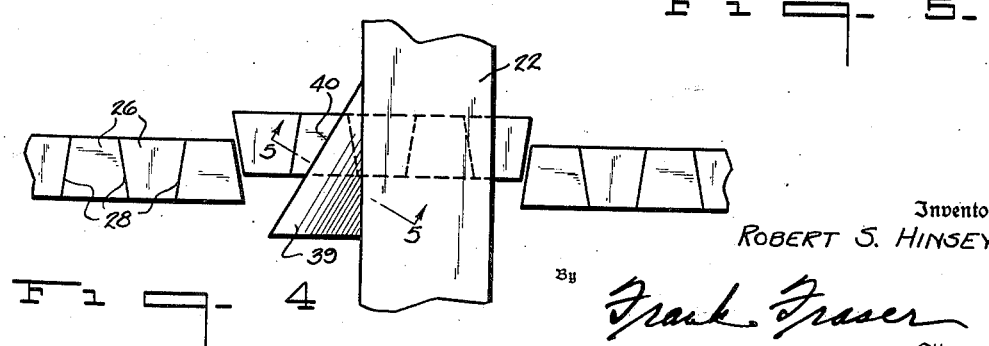

Patented Apr. 16, 1940

2,197,550

UNITED STATES PATENT OFFICE 2,197,550

APPARATUS FOR TEMPERING GLASS

Robert S. Hinsey, Toledo, Ohio, assignor to Libbey-Owens-Ford Glass Company, Toledo, Ohio, a corporation of Ohio Application August 23, 1937, Serial No. 160,433

14 Claims. (Cl. 49—45)

The present invention relates to the tempering of glass sheets, wherein the said sheets are first heated to approximately the softening point of the glass and then suddenly chilled, and is more particularly concerned with the means for heating the glass.

In carrying out this process of tempering glass sheets, the said sheets are ordinarily suspended in a vertical plane from their upper edges by relatively small hooks or tongs and passed horizontally through a tunnel type furnace wherein the glass is heated to a temperature approximating the softening point thereof. After being heated to the proper temperature, the glass sheets are passed from the furnace and subjected immediately to the action of the chilling or quenching means. The means for supporting the glass sheets within the furnace comprises a horizontal supporting bar from which the hooks or tongs are hung while the apparatus for carrying the supporting bar is arranged outwardly of said furnace and passes through a longitudinally extending slot in the top thereof. In order to prevent undue loss of heat from the furnace, and also the setting up of undesirable temperature conditions therein, means is usually provided for closing or sealing the slot in the top of the furnace but no entirely satisfactory means has been heretofore proposed for this purpose.

It is the object of this invention to provide novel and improved means for effectively sealing or closing the slot in the top of the furnace and yet permit the ready passage of the sheet supporting means, said sealing or closure means being of such construction and arrangement as to minimize the loss of heat from the furnace as well as the entrance of outside air into said furnace whereby to assist in the maintaining of constant, uniform temperature conditions therein.

Other objects and advantages of the invention will become more apparent during the course of the following description when taken in connection with the accompanying drawings.

In the drawings wherein like numerals are employed to designate like parts throughout the same:

Fig. 1 is a vertical transverse sectional view through the upper end of a furnace, showing the improved closure means provided by the invention associated therewith;

Fig. 2 is a vertical longitudinal sectional view through said furnace, showing the sheet supporting means in elevation;

Fig. 3 is a plan view of the furnace;

Fig. 4 is a diagrammatic view of the closure means illustrating the manner in which it is opened to permit passage of the supporting means;

Fig. 5 is a detail sectional view taken substantially on line 5—5 of Fig. 4;

Fig. 6 is a vertical transverse sectional view showing a slightly modified type of closure means; and Fig. 7 is a vertical longitudinal sectional view through the apparatus of Fig. 6.

With reference first to Figs. 1 to 5 of the drawings, the letter A designates in its entirety one type of furnace which may be used for heating the glass sheets to the desired temperature, said furnace being preferably of the tunnel type and having a longitudinally extending slot 10 in the top thereof. The slot 10 is normally closed by the improved closure means B, while the letter C designates in its entirety the means for supporting the glass sheets 11 during tempering.

The furnace A is also preferably, though not necessarily, of the electrically heated type, being provided at opposite sides thereof with electrical heating elements 12, carried by insulators 13, and which are adapted to be connected to any suitable controlling and indicating devices so that the temperature of the furnace can be accurately regulated. Baffle plates 14 may also be arranged inwardly of the heating elements 12 and which plates cooperate with the top and bottom walls of the furnace to form a compartment 15 within which the glass sheets are received.

The glass sheets 11 to be tempered are suspended from the supporting means C which is mounted outside the furnace; said sheets being moved along by said supporting means through the furnace which is in the form of a tunnel kiln of gradually increasing temperature. When the glass sheets have reached a proper temperature for chilling, they are removed through the outlet end of the furnace and subjected immediately to the action of suitable cooling means (not shown) but the operation of which is well known in the art.

The supporting means C is mounted for movement along a monorail 16 extending longitudinally above the slot 10 in the top of the furnace. The supporting means comprises a carriage or trolley 17 provided at its opposite ends with wheels 18 and 19 which run along the monorail 16. Secured to the carriage 17 is a longitudinally extending horizontal bar 20, from the opposite ends of which depend the vertical parallel hangers 21 and 22 connected together at their lower ends by a horizontal tong supporting bar 23 to form a rigid frame.

Mounted upon the tong supporting bar 23 are a plurality of relatively small tongs 24 which engage opposite faces of the glass sheets 11 adjacent the upper edges thereof. The tongs 24 are preferably movable along the supporting bar 23 to accommodate different sized sheets.

As will be clearly seen, the monorail 16, carriage 17, and horizontal bar 20 are arranged above and outwardly of the furnace, while the hangers 21 and 22 depend downwardly through the slot 10 in the top of said furnace so that the tong supporting bar 23 is within the furnace. In order to prevent undue loss of heat and also in order to minimize disturbance of the predetermined temperature conditions in the furnace, it is quite essential that the slot 10 be normally closed or sealed, and the aim of this invention is the provision of improved means serving as a closure for the slot 10 but which will permit the ready passage of the hangers 21 and 22.

To this end, there are provided above the furnace and at opposite sides of the slot 10 the two series of transverse bars or fingers 25 and 26, said fingers 25 and 26 inclining upwardly and inwardly, with the inner ends thereof engaging one another and being correspondingly mitered as at 27 to provide a tight joit. The fingers 25 and 26 are preferably of molded asbestos although they may be of any other desired material. Further, the fingers at each side of the slot 10 contact one another and the side walls of adjacent fingers are beveled in opposite directions from their outer to their inner faces, as indicated at 28 in Fig. 4, so that each finger has, in effect, a dove-tail connection with the two adjacent fingers.

The fingers at each side of the slot 10 are divided longitudinally of the furnace into a plurality of sections, with the fingers of each section being pivotally mounted at their inner ends upon a horizontal rod 29, said rods being arranged in horizontal alignment with one another and carried at the outer ends of lever arms 30. As shown in Fig. 3, each rod 29 is adapted to extend between two lever arms 30 and to be carried at its opposite ends thereby. Furthermore, each lever arm 30 is adapted to support the meeting ends of two adjacent rods 29. Each lever arm 30 is pivoted intermediate its ends upon a horizontal pin 31 carried by a bracket 32 secured to the top of the furnace by bolts 33 which pass through slots 34 in the base member 35 of said bracket. Passing upwardly through the outer end 36 of the lever arm 30 is a set screw 37 engaging the under-surface of the top portion 38 of bracket 32.

In practice, the fingers 25 and 26 at opposite sides of the slot 10 engage one another at their inner ends as shown in Fig. 3 and are maintained in such position by gravity to close the said slot. However, due to the fact that said fingers are pivotally mounted at their outer ends upon the rods 29, the inner ends of said fingers can be readily moved upwardly away from one another to permit the passage of the hangers 21 and 22 of the supporting means C therebetween. This opening of the fingers is effected by securing to the forward edge of each of the hangers 21 and 22 a wedge element 39 provided with an inclined knife edge 40. As the carriage 17 is moved forwardly along the monorail 16, the wedge elements 39 passing between the two series of fingers 25 and 26 will serve to force the inner ends of opposed fingers upwardly away from one another, as shown in Fig. 1, to permit the passage of the hangers therebetween, and as soon as the hangers pass beyond the fingers, they will immediately drop downwardly into closed position. Consequently, the opposed fingers are only raised or opened temporarily just long enough to permit the passage of the hangers 21 and 22 therebetween, as a result of which loss of heat from the furnace through the slot 10 is reduced to a minimum as well as the entrance of outside air so that the desired temperature conditions within the furnace can be more uniformly and accurately maintained.

The use of a plurality of relatively short rods 29 rather than a single long rod is desirable for the following reason: When using a single long rod, there is a tendency for the rod to become warped or out of alignment due to expansion and contraction of the furnace as well as to the heat to which the rod is subjected, and of course any distortion of the rod would result in the fingers 25 and 26 being thrown out of alignment with one another. By using a plurality of relatively short rods and mounting the rods in the manner shown, the said rods can be adjusted both vertically and horizontally to compensate for any expansion or contraction of the furnace or the distortion of the rods themselves. This can be done by proper adjustment of the set screws 37 to raise or lower the rods 29 as may be required to bring them back into alignment with one another and the inner ends of opposed fingers in proper engagement. Due to the provision of the slots 34 in brackets 32, the said brackets can also be moved inwardly or outwardly as desired to take care of horizontal distortion of the bars.

Although not essential, the slot 10 may be partly closed, as in Fig. 1, by cover tiles 41 supported upon the top of the furnace and carried by these cover tiles are strips 42 of asbestos or the like which seal the space beneath the outer ends of the fingers 25 and 26.

In Figs. 6 and 7 is illustrated a slightly modified construction including the two series of fingers 43 and 44 arranged at opposite sides of the slot 10 and pivotally mounted at their outer ends upon rods 45 and 46 respectively which are preferably in the form of a plurality of aligned, relatively short sections as described above. The means for opening the fingers 43 and 44 to permit the passage of the hangers 21 and 22 therebetween includes a pair of actuating elements 47 and 48 secured to the opposite sides of each hanger by a bolt or the like 49. The upper end of each actuating element 47 and 48 is bent outwardly and terminates in a cam 50 having a relatively wide cam surface 51 which is not only inclined transversely as shown in Fig. 6 but also curved longitudinally of the furnace as illustrated in Fig. 7. As the sheet supporting means moves forwardly, the cam surfaces 51 of the actuating elements 50 engaging fingers 43 and 44 will move them upwardly to separate the inner ends thereof so that the hangers can pass therebetween. The principal advantage of this construction over that illustrated in Figs. 1 to 5 is that there will be less wear on the fingers as well as on the actuating means therefor due to the provision of the relatively wide cam surfaces 51.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The combination with a furnace having a slot in the top thereof, of closure means for said slot including two series of fingers arranged at opposite sides thereof, said fingers extending inwardly and upwardly toward one another with the inner ends thereof freely abutting one another and maintained in closed position by gravity, and longitudinally extending, horizontal rods for pivotally mounting said fingers at their outer ends so that the inner ends of opposed fingers at opposite sides of the slot are movable freely upwardly away from one another.

2. The combination with a furnace having a slot in the top thereof, of closure means for said slot including two series of fingers arranged at opposite sides thereof, said fingers extending inwardly with the inner ends thereof freely abutting one another and maintained in closed position by gravity, means for mounting said fingers so that the inner ends of opposed fingers at opposite sides of the slot are movable freely upwardly away from one another, and means for adjustably supporting said last-named means so that the outer ends of said fingers may be moved vertically.

3. The combination with a furnace having a slot in the top thereof, of closure means for said slot including two series of fingers arranged at opposite sides thereof, said fingers extending inwardly with the inner ends thereof freely abutting one another and maintained in closed position by gravity, means for mounting said fingers so that the inner ends of opposed fingers at opposite sides of the slot are movable freely upwardly away from one another, and means for adjustably supporting said last-named means so that said fingers may be moved bodily horizontally with respect to said slot.

4. The combination with a furnace having a slot in the top thereof, of closure means for said slot including two series of fingers arranged at opposite sides thereof, said fingers extending inwardly with the inner ends thereof freely abutting one another and maintained in closed position by gravity, means for mounting said fingers so that the inner ends of opposed fingers at opposite sides of the slot are movable freely upwardly away from one another, means for adjustably supporting said last-named means so that the outer ends of said fingers may be moved vertically, and means for also adjustably supporting said finger mounting means so that the said fingers may be moved bodily horizontally with respect to said slot.

5. The combination with a furnace having a slot in the top thereof, of closure means for said slot including two series of fingers arranged at opposite sides thereof, said fingers extending inwardly with the inner ends thereof freely abutting one another, longitudinally extending horizontal rods upon which said fingers are pivotally mounted at their outer ends whereby the inner ends of opposed fingers at opposite sides of the slot are movable freely upwardly away from one another, and means for adjusting said rods vertically.

6. The combination with a furnace having a slot in the top thereof, of closure means for said slot including two series of fingers arranged at opposite sides thereof, said fingers extending inwardly with the inner ends thereof freely abutting one another, longitudinally extending horizontal rods upon which said fingers are pivotally mounted at their outer ends whereby the inner ends of opposed fingers at opposite sides of the slot are movable freely upwardly away from one another, and means for adjusting said rods horizontally with respect to said slot.

7. The combination with a furnace having a slot in the top thereof, of closure means for said slot including two series of fingers arranged at opposite sides thereof, said fingers extending inwardly with the inner ends thereof freely abutting one another, longitudinally extending horizontal rods upon which said fingers are pivotally mounted at their outer ends whereby the inner ends of opposed fingers at opposite sides of the slot are movable freely upwardly away from one another, means for adjusting said rods vertically, and means for adjusting said rods horizontally with respect to said slot.

8. The combination with a furnace having a slot in the top thereof, of closure means for said slot including two series of fingers arranged at opposite sides thereof, said fingers extending inwardly and upwardly with the inner ends thereof freely abutting one another, means for mounting the fingers at each side of the slot including a plurality of longitudinally extending aligned rods upon which said fingers are pivotally mounted at their outer ends, and pivotally mounted lever arms for carrying said rods.

9. The combination with a furnace having a slot in the top thereof, of closure means for said slot including two series of fingers arranged at opposite sides thereof, said fingers extending inwardly and upwardly with the inner ends thereof freely abutting one another, means for mounting the fingers at each side of the slot including a plurality of longitudinally extending aligned rods upon which said fingers are pivotally mounted at their outer ends, and pivotally mounted lever arms supporting the rods at their opposite ends, each rod extending between two lever arms and each lever arm supporting the meeting ends of adjacent rods.

10. The combination with a furnace having a slot in the top thereof, of closure means for said slot including two series of fingers arranged at opposite sides thereof, said fingers extending inwardly and upwardly with the inner ends thereof freely abutting one another, means for mounting the fingers at each side of the slot including a plurality of longitudinally extending aligned rods upon which said fingers are pivotally mounted at their outer ends, pivotally mounted lever arms for carrying said rods, and means for pivoting said lever arms to raise or lower said rods and to maintain the said rods in desired adjusted position.

11. The combination with a furnace having a slot in the top thereof, of closure means for said slot including two series of fingers arranged at opposite sides thereof, said fingers extending inwardly and upwardly with the inner ends thereof freely abutting one another, means for mounting the fingers at each side of the slot including a plurality of longitudinally extending aligned rods upon which said fingers are pivotally mounted at their outer ends, pivotally mounted lever arms for carrying said rods, and means for mounting said lever arms for bodily horizontal movement to effect horizontal adjustment of said rods.

12. The combination with a furnace having a slot in the top thereof, of closure means for said slot including two series of fingers arranged at opposite sides thereof, said fingers extending inwardly and upwardly with the inner ends thereof freely abutting one another, means for mounting the fingers at each side of the slot including a plurality of longitudinally extending aligned rods upon which said fingers are pivotally mounted at their outer ends, pivotally mounted lever arms supporting the rods at their opposite ends, each rod extending between two lever arms and each lever arm supporting the meeting ends of adjacent rods, means for pivoting said lever arms to raise or lower said rods and to maintain the said rods in desired adjusted position, and means for mounting said lever arms for bodily horizontal movement to effect horizontal adjustment of said rods.

13. The combination with a furnace having a slot in the top thereof and work supporting means mounted above said furnace and having portions depending through said slot, said work supporting means being movable longitudinally of said furnace, of closure means for said slot including two series of fingers arranged at opposite sides thereof, said fingers extending inwardly with the inner ends thereof freely abutting one another, means for mounting said fingers so that the inner ends of opposed fingers at opposite sides of the slot are movable freely upwardly away from one another, and means carried by said work supporting means for moving the opposed fingers upwardly away from one another to permit the passage of said work supporting means therebetween.

14. The combination with a furnace having a slot in the top thereof and work supporting means mounted above said furnace and having portions depending through said slot, said work supporting means being movable longitudinally of said furnace, of closure means for said slot including two series of fingers arranged at opposite sides thereof, said fingers extending inwardly with the inner ends thereof freely abutting one another, means for pivotally mounting said fingers at their outer ends so that the inner ends of opposed fingers at opposite sides of the slot are movable freely upwardly away from one another, and means carried by those portions of the work supporting means which depend through said slot for moving the opposed fingers upwardly away from one another to permit the passage of said work supporting means therebetween.

ROBERT S. HINSEY.